(12) United States Patent
Zinger et al.

(10) Patent No.: US 11,301,263 B2
(45) Date of Patent: Apr. 12, 2022

(54) SYSTEM AND METHOD FOR SUSPENDING AND PROCESSING COMMANDS ON A CONFIGURATION OBJECT

(71) Applicant: EMC IP Holding Company, LLC, Hopkinton, MA (US)

(72) Inventors: Eldad Zinger, Raanana (IL); Ran Anner, Kfar Saba (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 218 days.

(21) Appl. No.: 16/668,629

(22) Filed: Oct. 30, 2019

(65) Prior Publication Data
US 2021/0132958 A1 May 6, 2021

(51) Int. Cl.
| | |
|---|---|
| *G06F 9/00* | (2006.01) |
| *G06F 9/445* | (2018.01) |
| *G06F 9/4401* | (2018.01) |
| *G06F 9/50* | (2006.01) |
| *G06F 3/06* | (2006.01) |

(52) U.S. Cl.
CPC ........ *G06F 9/44505* (2013.01); *G06F 3/0605* (2013.01); *G06F 3/067* (2013.01); *G06F 3/0631* (2013.01); *G06F 3/0659* (2013.01); *G06F 9/4416* (2013.01); *G06F 9/5011* (2013.01); *G06F 9/4401* (2013.01)

(58) Field of Classification Search
CPC .. G06F 9/44505; G06F 9/4416; G06F 9/5011; G06F 3/067; G06F 3/0605; G06F 3/0631; G06F 3/0659

USPC ........................................................... 713/1
See application file for complete search history.

(56) References Cited

U.S. PATENT DOCUMENTS

| | | | | |
|---|---|---|---|---|
| 8,924,595 | B1* | 12/2014 | Joyce | G06F 11/261 710/5 |
| 9,923,762 | B1* | 3/2018 | Zhang | G06F 8/65 |
| 2005/0289197 | A1* | 12/2005 | Kan | G06F 11/2097 |
| 2007/0094471 | A1* | 4/2007 | Shaath | G06F 12/1466 711/163 |
| 2007/0192526 | A1* | 8/2007 | Sharma | G06F 11/2069 710/311 |
| 2014/0136768 | A1* | 5/2014 | Iglesia | G06F 3/0688 711/103 |
| 2016/0004616 | A1* | 1/2016 | Narita | G06F 3/065 714/6.3 |
| 2016/0196424 | A1* | 7/2016 | Chapman, III | G06F 21/53 726/1 |
| 2017/0285979 | A1* | 10/2017 | Singh | G06F 3/0689 |
| 2017/0286331 | A1* | 10/2017 | Kobayashi | G06F 13/1689 |

* cited by examiner

*Primary Examiner* — Volvick Derose
(74) *Attorney, Agent, or Firm* — Brian J. Colandreo; Mark H. Whittenberger; Holland & Knight LLP

(57) ABSTRACT

A method, computer program product, and computing system for receiving a plurality of input/output (IO) commands for a plurality of configuration objects of a storage system. A modification command for a configuration object of the plurality of configuration objects may be received. The configuration object may be suspended in response to receiving the modification command. One or more IO commands directed to the suspended configuration object from the plurality of IO commands may be processed before the configuration object is modified.

14 Claims, 6 Drawing Sheets

| bitmap (600) | | | | | | | | | |
|---|---|---|---|---|---|---|---|---|---|
| 512 | 514 | 516 | 518 | | | | | | |
| 1 | 1 | 1 | 1 | | | | | | |

FIG. 6

| bitmap (600) | | | | | | | | | |
|---|---|---|---|---|---|---|---|---|---|
| 512 | 514 | 516 | 518 | | | | | | |
| 1 | 0 | 1 | 1 | | | | | | |

FIG. 7

| suspended command queue (800) | | | | | | | | | |
|---|---|---|---|---|---|---|---|---|---|
| 520 | 522 | 524 | 526 | | | | | | |

FIG. 8

SYSTEM AND METHOD FOR SUSPENDING AND PROCESSING COMMANDS ON A CONFIGURATION OBJECT

BACKGROUND

Storing and safeguarding electronic content may be beneficial in modern business and elsewhere. Accordingly, various methodologies may be employed to protect and distribute such electronic content.

Conventional storage systems may utilize many central processing units (CPUs) to concurrently process IO commands or operations on a configuration object. In such systems, there is usually a request for a barrier mechanism to suspend command processing and to release command processing. A common implementation for such a barrier mechanism is to use a command counter per configuration object. One problem with this approach is that the counter needs to be protected from concurrent updates. While this could be done by using atomic operations or locks, this approach imposes a performance impact that can be too high (e.g., due to lock contention, cache line contention, etc.). Another conventional approach is to split the command counter to a counter per thread, thus eliminating the concurrent update problem. However, this approach imposes another problem, higher memory consumption. In addition, this approach may request arithmetic operations for each command (e.g., a counter increment and decrement) even if there is no suspend request.

SUMMARY OF DISCLOSURE

In one example implementation, a computer-implemented method executed on a computing device may include, but is not limited to, receiving a plurality of input/output (IO) commands for a plurality of configuration objects of a storage system. A modification command for a configuration object of the plurality of configuration objects may be received. The configuration object may be suspended in response to receiving the modification command. One or more IO commands directed to the suspended configuration object from the plurality of IO commands may be processed before the configuration object is modified.

One or more of the following example features may be included. Suspending the configuration object may include generating a bitmap based upon, at least in part, whether each of the plurality of IO commands are directed to the suspended configuration object. One or more IO commands directed to the suspended configuration object received subsequent to suspending the configuration object may be suspended. One or more IO commands directed to the suspended configuration object received prior to suspending the configuration object may be processed based upon, at least in part, the bitmap. The configuration object may be modified based on the modification request in response to processing the one or more IO commands directed to the suspended configuration object received prior to suspending the configuration object and suspending the one or more IO commands directed to the suspended configuration object received subsequent to suspending the configuration object based upon, at least in part, the bitmap. The suspension of the configuration object may be released. The suspended one or more IO commands directed to the configuration object received subsequent to suspending the configuration object may be processed. The configuration object may include a storage volume within the storage system.

In another example implementation, a computer program product resides on a computer readable medium that has a plurality of instructions stored on it. When executed by a processor, the instructions cause the processor to perform operations that may include, but are not limited to, receiving a plurality of input/output (IO) commands for a plurality of configuration objects of a storage system. A modification command for a configuration object of the plurality of configuration objects may be received. The configuration object may be suspended in response to receiving the modification command. One or more IO commands directed to the suspended configuration object from the plurality of IO commands may be processed before the configuration object is modified.

One or more of the following example features may be included. Suspending the configuration object may include generating a bitmap based upon, at least in part, whether each of the plurality of IO commands are directed to the suspended configuration object. One or more IO commands directed to the suspended configuration object received subsequent to suspending the configuration object may be suspended. One or more IO commands directed to the suspended configuration object received prior to suspending the configuration object may be processed based upon, at least in part, the bitmap. The configuration object may be modified based on the modification request in response to processing the one or more IO commands directed to the suspended configuration object received prior to suspending the configuration object and suspending the one or more IO commands directed to the suspended configuration object received subsequent to suspending the configuration object based upon, at least in part, the bitmap. The suspension of the configuration object may be released. The suspended one or more IO commands directed to the configuration object received subsequent to suspending the configuration object may be processed. The configuration object may include a storage volume within the storage system.

In another example implementation, a computing system includes at least one processor and at least one memory architecture coupled with the at least one processor, wherein the at least one processor may be configured to receive a plurality of input/output (IO) commands for a plurality of configuration objects of a storage system. The at least one processor may be further configured to receive a modification command for a configuration object of the plurality of configuration objects. The at least one processor may be further configured to suspend the configuration object in response to receiving the modification command. The at least one processor may be further configured to process one or more IO commands directed to the suspended configuration object from the plurality of IO commands before the configuration object is modified.

One or more of the following example features may be included. Suspending the configuration object may include generating a bitmap based upon, at least in part, whether each of the plurality of IO commands are directed to the suspended configuration object. One or more IO commands directed to the suspended configuration object received subsequent to suspending the configuration object may be suspended. One or more IO commands directed to the suspended configuration object received prior to suspending the configuration object may be processed based upon, at least in part, the bitmap. The configuration object may be modified based on the modification request in response to processing the one or more IO commands directed to the suspended configuration object received prior to suspending the configuration object and suspending the one or more IO commands directed to the suspended configuration object received subsequent to suspending the configuration object based upon, at least in part, the bitmap. The suspension of the configuration object may be released. The suspended one or more IO commands directed to the configuration object received subsequent to suspending the configuration object may be processed. The configuration object may include a storage volume within the storage system.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIGS. 6-7 are example diagrammatic views of bitmaps according to one or more example implementations of the disclosure; and FIG. 8 is an example diagrammatic view of a suspended command queue according to one or more example implementations of the disclosure.

Like reference symbols in the various drawings indicate like elements.

DETAILED DESCRIPTION

Figure 1:
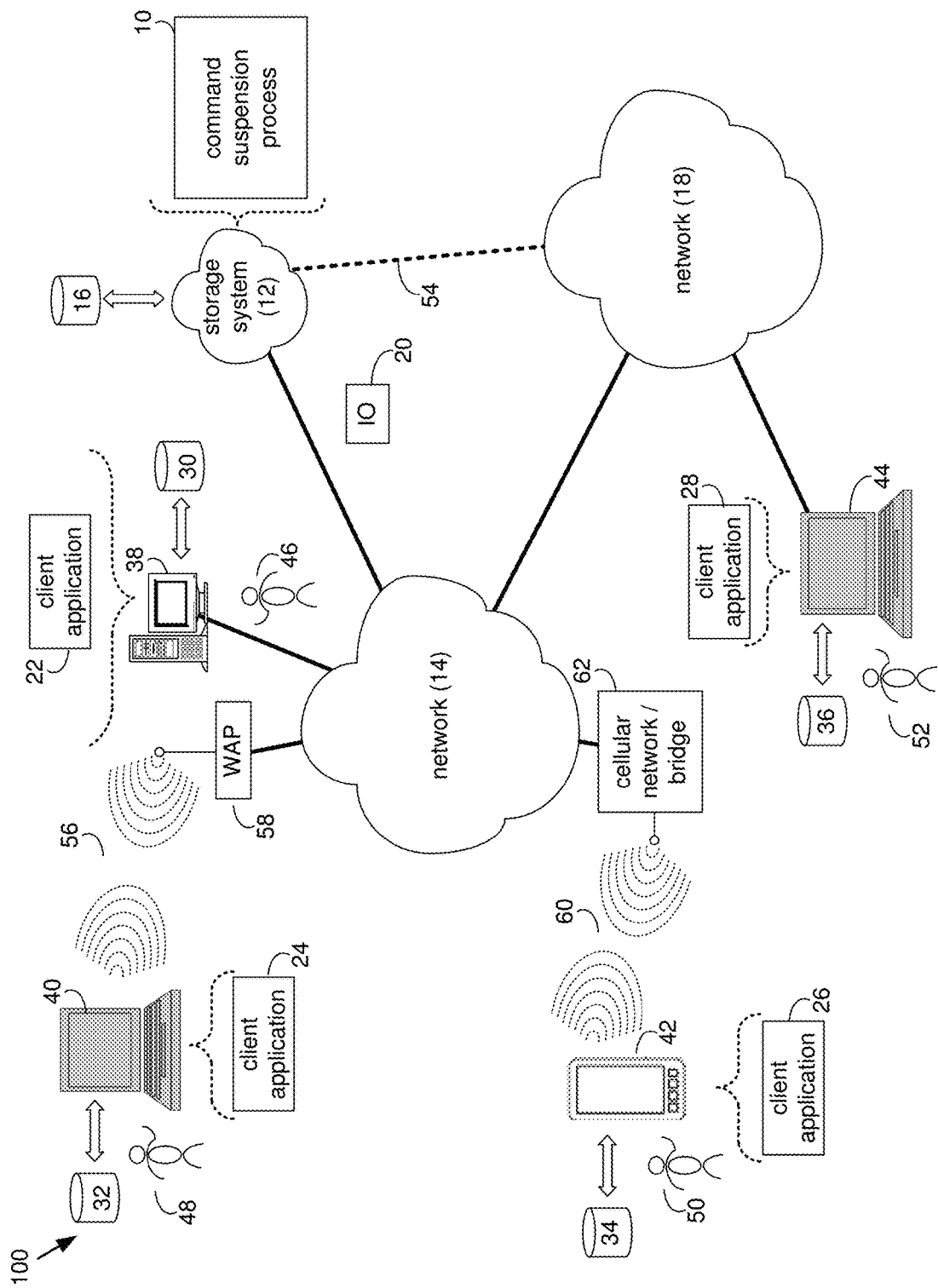
FIG. 1 is an example diagrammatic view of a storage system and a command suspension process coupled to a distributed computing network according to one or more example implementations of the disclosure.

System Overview:

Referring to FIG. 1, there is shown command suspension process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of command suspension process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of command suspension process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a command suspension process, such as command suspension process 10 of FIG. 1, may include but is not limited to, receiving a plurality of input/output (IO) commands for a plurality of configuration objects of a storage system. A modification command for a configuration object of the plurality of configuration objects may be received. The configuration object may be suspended in response to receiving the modification command. One or more IO commands directed to the suspended configuration object from the plurality of IO commands may be processed before the configuration object is modified.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
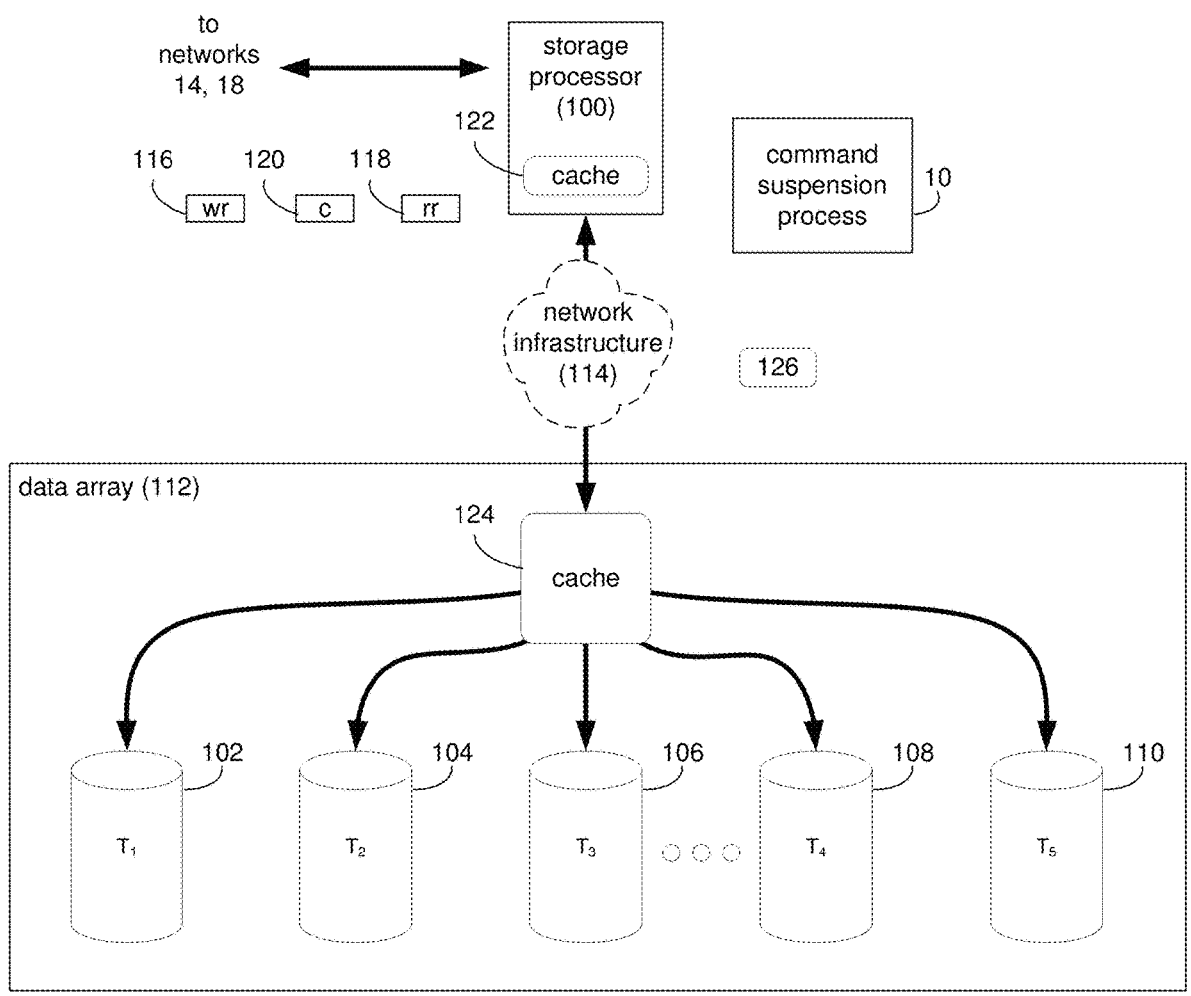
FIG. 2 is an example diagrammatic view of the storage system of FIG. 1 according to one or more example implementations of the disclosure.
Figure 3:
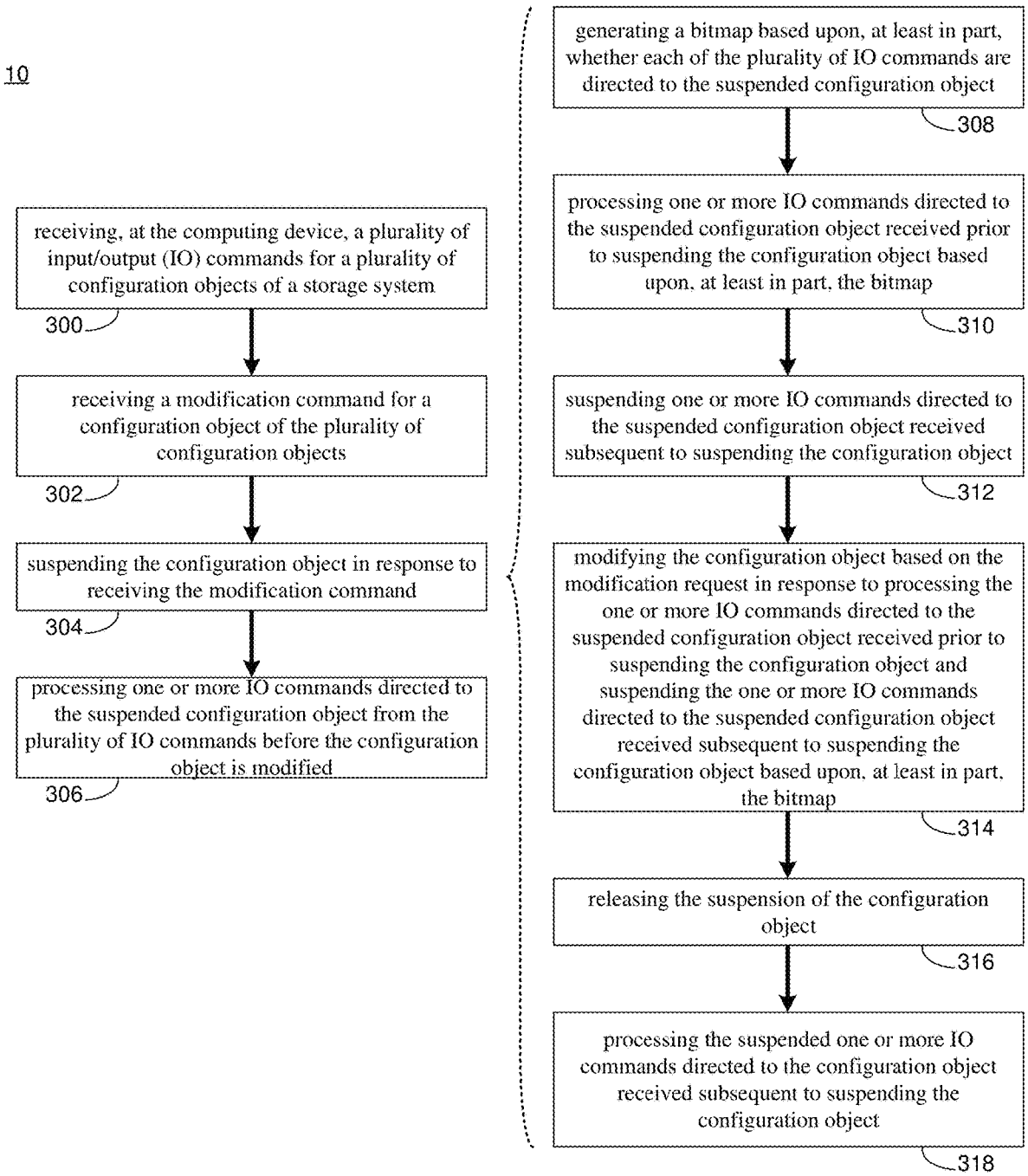
FIG. 3 is an example flowchart of the command suspension process of FIG. 1 according to one or more example implementations of the disclosure.
Figure 4:
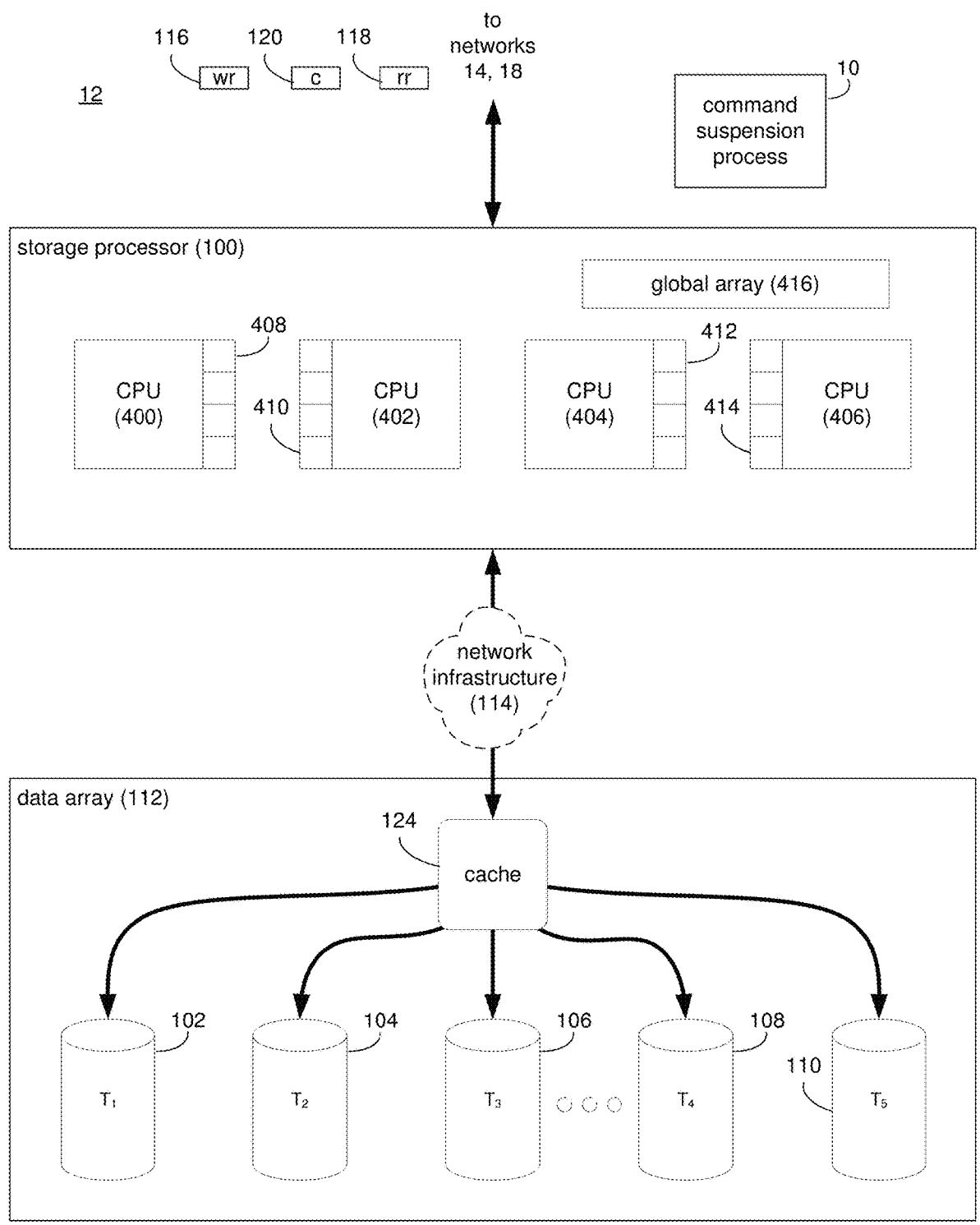
FIGS. 4-5 are example diagrammatic views of the storage system of FIG. 1 according to one or more example implementations of the disclosure.
Figure 5:
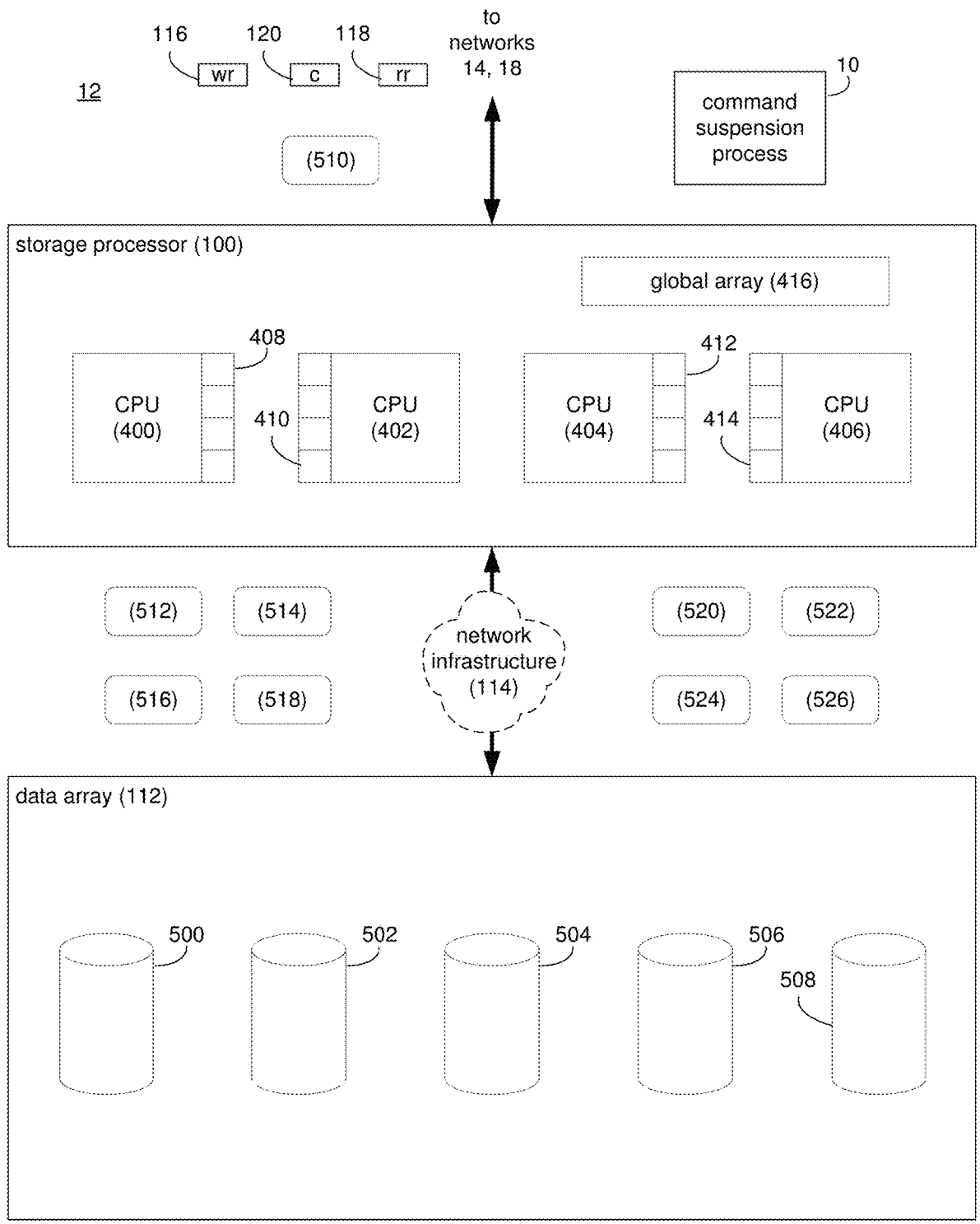

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of command suspension process 10. The instruction sets and subroutines of command suspension process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of command suspension process 10 may be stored on storage devices (and/or executed by processors and memory architectures) that are external to storage system 12.

As discussed above, various 10 requests or commands (e.g. 10 request 20) may be generated. For example, these 10 requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of command suspension process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of command suspension process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Command Suspension Process:

Referring also to FIGS. 3-8 and in some implementations, command suspension process 10 may receive 300 a plurality of input/output (IO) commands for a plurality of configuration objects of a storage system. A modification command for a configuration object of the plurality of configuration objects may be received 302. The configuration object may be suspended 304 in response to receiving the modification command. One or more IO commands directed to the suspended configuration object from the plurality of IO commands may be processed 306 before the configuration object is modified.

As will be discussed in greater detail below, implementations of the present disclosure may allow configuration objects in a storage system to be modified by suspending IO commands associated with a modified version of a configuration object and allowing one or more IO commands associated with the pre-modified configuration object to be processed before the configuration object is modified.

Conventional storage systems may utilize many central processing units (CPUs) to concurrently process IO commands or operations. In such systems, there is usually a request for a barrier mechanism. A barrier mechanism may provide an application program interface (API) to suspend the command processing and to release the command processing. A common implementation for such a barrier mechanism is to use a command counter per configuration object. One problem with this approach is that the counter needs to be protected from concurrent updates. While this could be done by using atomic operations or locks, this approach imposes a performance impact that can be too high (e.g., due to lock contention, cache line contention, etc.). Another conventional approach is to split the command counter to a counter per thread, thus eliminating the concurrent update problem. However, this approach imposes another problem, higher memory consumption. For example, with "N" as the number of configuration objects and "M" as the number of threads or cores, this approach consumes O(MN) additional memory. In one example storage system configuration, N may be approximately $2^{17}$, M may be $2^6$, the size of a counter may be e.g., 2 bytes. As such, the memory overhead may be $2^{24}$ or 16 megabytes. When scaled to e.g., millions of configuration objects, the memory penalty will be higher. In addition, this approach may request arithmetic operations for each command (e.g., counter increment and decrement) even if there is no suspend request. Accordingly and as will be discussed in greater detail below, embodiments of the present disclosure may avoid these challenges by waiting for commands directed to a pre-modified version of a configuration object to process before modifying the configuration object.

In some implementations, command suspension process 10 may receive 300 a plurality of input/output (IO) commands for a plurality of configuration objects of a storage system. Referring also to the example of FIG. 4 and in some implementations, storage processor 100 may include a plurality of central processing units (CPUs) and/or a multicore CPU configured to process multiple IO commands concurrently on separate cores of the multicore CPU. While the example of FIGS. 4-5 include multiple CPUs (e.g., CPUs 400, 402, 404, 406), it will be appreciated that each CPU may represent a core of a multicore CPU and/or a separate CPU of storage processor 100. In some implementations, each CPU or core of the multicore CPU may include a command processing queue or job queue (e.g., command processing queues 408, 410, 412, 414). In some implementations, each command processing queue or job queue (e.g., command processing queues 408, 410, 412, 414) may be configured to process one command at a time. As such and in some implementations, commands may not preempt one another in the command processing queue.

As discussed above regarding FIG. 2 and in some implementations, a plurality of IO commands may be received 300 for a plurality of configuration objects. Referring also to the example of FIG. 5 and in some implementations, storage system 12 may include a plurality of configuration objects (e.g., configuration objects 500, 502, 504, 506, 508). A configuration object may generally include a storage object or device. In some implementations, a configuration object may be a storage volume (e.g., physical or virtual), a Logical Unit Number (LUN), etc. As will be discussed in greater detail below, IO commands may be received 300 for reading and/or writing data to and from a configuration object while other types of commands may modify attributes associated with the configuration object.

In some implementations, receiving 300 the plurality of IO commands may include entering each IO command into a global array (e.g., global array 416) that is accessible by each CPU or each core of a multicore CPU within storage processor 100. In some implementations, the global array (e.g., global array 416) may indicate which IO commands are inflight or invalid. An inflight command may generally refer to an IO command that is addressed to a pre-modified version of a configuration object. As will be discussed in greater detail below, because of the concurrent processing of commands for a configuration object, a modification command for modifying one or more attributes may be received before IO commands that are addressed to the pre-modified version of the configuration object are finished processing on the configuration object. In this manner, command suspension process 10 may allow inflight commands to be processed with minimal processing overhead (e.g., compared to the overhead associated with multicore CPU locks and counters).

In some implementations, command suspension process 10 may receive 302 a modification command for a configuration object of the plurality of configuration objects. For example, suppose a user (e.g., user 46) desires to modify an attribute of a storage volume (e.g., configuration object 502) within storage system 12. In this example, command suspension process 10 may receive the user's request to modify configuration object 502 and may generate modification command 510. Unlike an IO command which may modify data stored within a configuration object, modifying an attribute of a configuration object may modify how the configuration object is deployed. For example, attributes of a configuration may include the name of the configuration object, the size of the configuration object, the logical-to-physical mapping of logical configuration objects to storage targets of the storage system, etc. In this manner, a user may modify attributes of a configuration object that once processed, may cause any IO commands addressed to the pre-modified version of the configuration object to fail or cause errors within the configuration object. For example, suppose CPU 400 receives a modification command to modify an attribute of configuration object 502. Further suppose that CPU 402 previously received an IO command addressed to configuration object 502 but had not finished processing the IO command before CPU 400 executed the modification command. In this example, when the IO command is fully processed by CPU 402 on configuration object 502, the constraints of the IO command may no longer be valid. Accordingly, the inflight IO commands received prior to modifying the configuration object may be lost or failed when processing IO commands on a modified configuration object via multiple CPUs or a multicore CPU using conventional approaches.

In some implementations, command suspension process 10 may suspend 304 the configuration object in response to receiving the modification command. In some implementations and as will be discussed in greater detail below, suspending 304 the configuration object may generally include preventing subsequent IO commands from being processed by the plurality of CPUs or multicore CPU and completing the processing of IO commands that were started before the modification command was received. In some implementations, suspending the configuration object may include setting a flag or bit within each configuration object or other data structure to indicate that the configuration object is suspended. Continuing with the above example where user 46 desires to modify an attribute of configuration object 502, command suspension process 10 may suspend 304 configuration object 502 in response to receiving modification command 510.

In some implementations, suspending 304 the configuration object may include generating 308 a bitmap based upon, at least in part, whether each of the plurality of IO commands are directed to the suspended configuration object. Referring again to the example of FIG. 5 and in some implementations, command suspension process 10 may receive 300 and begin processing a plurality of IO commands (e.g., IO commands 512, 514, 516, 518) prior to receiving 302 and processing modification command 510. In some implementations and as will be discussed in greater detail below, command suspension process 10 may receive 300 a plurality of IO commands (e.g., IO commands 520, 522, 524, 526) subsequent to receiving 302 and processing modification command 510.

Referring also to the example of FIG. 6 and in some implementations, command suspension process 10 may generate 308 a bitmap (e.g., bitmap 600) based upon, at least in part, whether each of the plurality of IO commands are directed to the suspended configuration object. For example, command suspension process 10 may generate 308 bitmap 600 by determining whether each IO command is directed to or addressed to a suspended configuration object. In some implementations, command suspension process 10 may generate a bitmap for each configuration object that is suspended 304. In this example, suppose each of IO commands 512, 514, 516, 518 are directed to suspended configuration object 502. Accordingly, command suspension process 10 may include each of IO commands 512, 514, 516, 518 because each of these IO commands are directed to configuration object 502. In some implementations, command suspension process 10 may initially set all the bits that correspond to IO commands that are directed to the suspended configuration object. In the example of FIG. 6, command suspension process 10 may initially set all the bits that correspond to IO commands 512, 514, 516, 518 to e.g., "1".

In some implementations, command suspension process 10 may process 306 one or more IO commands directed to the suspended configuration object from the plurality of IO commands before the configuration object is modified. As discussed above and in some implementations, command suspension process 10 may allow inflight IO commands to be processed before modifying a configuration object while suspending subsequent IO commands. Referring again to the example of FIG. 5 and in some implementations, command suspension process 10 may process 306 one or more IO commands directed to the suspended configuration object (e.g., IO commands 512, 514, 516, 518) before modifying configuration object 502.

In some implementations, command suspension process 10 may process 310 one or more IO commands directed to the suspended configuration object received prior to suspending the configuration object based upon, at least in part, the bitmap. In some implementations and referring again to the example of FIG. 6, command suspension process 10 may poll the IO commands of the bitmap. In some implementations, command suspension process 10 may poll by iterating over the set bits (e.g., "1's" of the bitmap). Referring also to the example of FIG. 7 and in some implementations, command suspension process 10 may clear a bit (e.g., change a "1" to a "0") when the command refers to a different configuration object (i.e., the command completed and has been recycled for another configuration object). In some implementations and as will be described in greater detail below, command suspension process 10 may also clear the bit when command suspension process 10 determines that a command is marked as suspended. In some implementations, when a command is still being processed by a CPU or a core of a multicore CPU, command suspension process 10 may leave the bit set in the bitmap (e.g., "1") and poll the next IO command of the bitmap. In some implementations and after polling an IO command in the bitmap and determining that the IO command is still being processed and/or after polling all of the IO commands in the bitmap and determining that at least one IO command is still being processed, command suspension process 10 may pause or "sleep" for a predefined period of time to allow the CPUs or cores of a multicore CPU to finish processing the IO commands. In some implementations, the duration of the pause may be used-defined and/or defined automatically by command suspension process 10. In one example, the predefined duration of the pause may range from e.g., ten milliseconds to e.g., one second. However, it will be appreciated that any pause duration may be used within the scope of the present disclosure.

Referring again to the example of FIG. 7 and in some implementations, suppose that command suspension process 10 polls IO command 512 and determines that IO command 512 is still being processed. In this example, because IO command 512 is still being processed, command suspension process 10 may pause for a predefined period of time and/or continue polling through IO commands 514, 516, 518 before pausing for the predefined period of time. In this example, suppose command suspension process 10 is configured to pause after iterating through each of the IO commands and determining that at least one IO command is still being processed by a CPU or a core of a multicore CPU. Now suppose that command suspension process 10 determines that IO command has completed and/or is no longer directed to configuration object 502 (e.g., if IO command 514 completed and was recycled for another configuration object). In this example, command suspension process 10 may clear the bit associated with IO command 514. In some implementations, command suspension process 10 may determine that IO commands 516 and 518 are still being processed. Accordingly, command suspension process 10 may retain the "1" bit in the bitmap for IO commands 516 and 518 and may pause for the predefined period of time. In some implementations, after the pause duration, command suspension process 10 may iteratively re-poll the bits of the bitmap until each bit is cleared (e.g., "0").

In some implementations, command suspension process 10 may suspend 312 one or more IO commands directed to the suspended configuration object received subsequent to suspending the configuration object. As discussed above and in some implementations, command suspension process 10 may receive a plurality of IO commands subsequent or after the modification command is received (e.g., IO commands 520, 522, 524, 526). In some implementations, command suspension process 10 may determine which configuration object each IO command is directed to. In some implementations, if command suspension process 10 determines that the configuration object is suspended, command suspension process 10 may suspend 312 that IO command. In some implementations, suspending 312 one or more IO commands directed to the suspended configuration object may include generating a suspended command queue. Referring also to the example of FIG. 8 and in some implementations, command suspension process 10 may generate a suspended command queue (e.g., suspended command queue 800) for the one or more IO commands received subsequent to suspending the configuration object (e.g., IO commands 520, 522, 524, 526). In some implementations, command suspension process 10 may generate a suspended command queue for each suspended configuration object. In some implementations, command suspension process 10 may not include or add subsequently received IO commands to the bitmap because these IO commands may be suspended as discussed above.

In some implementations, command suspension process 10 may modify 314 the configuration object based on the modification request in response to processing 310 the one or more IO commands directed to the suspended configuration object received prior to suspending the configuration object and suspending 312 the one or more IO commands directed to the suspended configuration object received subsequent to suspending the configuration object based upon, at least in part, the bitmap. In some implementations and referring also to the examples of FIGS. 7-8, suppose command suspension process 10 determines that IO commands 512, 516, and 518 have completed and/or are no longer directed to configuration object 502. In this example, command suspension process 10 may clear the bits associated with IO commands 512, 516, and 518. Accordingly, because each of the bits of bitmap 600 are cleared (e.g., "0"), command suspension process 10 may determine that each of the one or more IO commands directed to the suspended configuration object received prior to suspending the configuration object (e.g., IO commands 512, 514, 516, 518) has been processed.

In some implementations and as discussed above, command suspension process 10 may suspend 312 one or more IO commands directed to the suspended configuration object received subsequent to suspending the configuration object by generating a suspended command queue and/or by adding the one or more IO commands directed to the suspended configuration object received subsequent to suspending the configuration object to the suspended command queue. Referring again to the example of FIG. 9, command suspension process 10 may add each of the IO commands directed to the suspended configuration object received subsequent to suspending the configuration object (e.g., IO commands 520, 522, 524, 526) to a suspended command queue (e.g., suspended command queue 800). Accordingly, command suspension process 10 may determine that each of the one or more IO commands directed to the suspended configuration object received subsequent to suspending the configuration object has been suspended or will be suspended. In some implementations, because command suspension process 10 has determined that each of the one or more IO commands directed to the suspended configuration object received prior to suspending the configuration object has been processed and each of the one or more IO commands directed to the suspended configuration object received subsequent to suspending the configuration object has been suspended or will be suspended, command suspension process 10 may modify 314 the configuration object based on the modification request. In this manner, command suspension process 10 may determine that each of the inflight IO commands has been processed and that any subsequent IO commands have been or will be suspended based upon, at least in part, the bitmap and the suspended command queue. Returning to the above example, command suspension process 10 may modify 314 configuration object 502 without failing any inflight IO commands and without prematurely processing IO commands directed to the modified configuration object.

In some implementations, command suspension process 10 may release 316 the suspension of the configuration object. In some implementations and in response to modifying 314 the configuration object, command suspension process 10 may release 316 the suspension of the configuration object. In some implementations, releasing 316 the suspension of the configuration object may include marking the configuration object as unsuspended and/or setting or clearing a flag within the configuration object indicating that the configuration object has been released. In some implementations, command suspension process 10 may ensure that all CPUs or cores of the multicore CPU are updated before processing the suspended IO commands. For example, command suspension process 10 may ensure that each CPU or core of the multicore CPU is updated by queuing a job on a command processing queue or job queue (e.g., command processing queues 408, 410, 412, 414) of each CPU or core of the multicore CPU and waiting for its completion. Because jobs will not preempt each other in the command processing queue, it is guaranteed that when command suspension process 10 receives an indication that the job has completed on some core or CPU, that that CPU or core will not suspend any more IO commands for the modified configuration object.

In some implementations and in response to releasing 316 the suspension of the configuration object, command suspension process 10 may process 318 the suspended one or more IO commands directed to the configuration object received subsequent to suspending the configuration object. For example, command suspension process 10 may process 318 the suspended one or more IO commands directed to the configuration object received subsequent to suspending the configuration object (e.g., IO commands 520, 522, 524, 526) by processing each IO command of the suspended command queue (e.g., suspended command queue 800).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving, at the computing device, a plurality of input/output (TO) commands for a plurality of configuration objects of a storage system;
   receiving a modification command for a configuration object of the plurality of configuration objects;
   suspending the configuration object in response to receiving the modification command, wherein suspending the configuration object includes generating a bitmap indicating whether each of the plurality of IO commands are directed to the suspended configuration object; and
   processing one or more IO commands directed to the suspended configuration object from the plurality of IO commands before the configuration object is modified.

2. The computer-implemented method of claim 1, further comprising:
   suspending one or more IO commands directed to the suspended configuration object received subsequent to suspending the configuration object.

3. The computer-implemented method of claim 2, further comprising:
   processing one or more IO commands directed to the suspended configuration object received prior to suspending the configuration object based upon, at least in part, the bitmap.

4. The computer-implemented method of claim 3, further comprising:
   modifying the configuration object based on the modification request in response to processing the one or more IO commands directed to the suspended configuration object received prior to suspending the configuration object and suspending the one or more IO commands directed to the suspended configuration object received subsequent to suspending the configuration object based upon, at least in part, the bitmap.

5. The computer-implemented method of claim 4, further comprising:
   releasing the suspension of the configuration object; and
   processing the suspended one or more IO commands directed to the configuration object received subsequent to suspending the configuration object.

6. The computer-implemented method of claim 1, wherein the configuration object includes a storage volume within the storage system.

7. A computer program product residing on a non-transitory computer readable medium having a plurality of instructions stored thereon which, when executed by a processor, cause the processor to perform operations comprising:
   receiving a plurality of input/output (TO) commands for a plurality of configuration objects of a storage system;
   receiving a modification command for a configuration object of the plurality of configuration objects;
   suspending the configuration object in response to receiving the modification command, wherein suspending the configuration object includes generating a bitmap indicating whether each of the plurality of IO commands are directed to the suspended configuration object; and
   processing one or more IO commands directed to the suspended configuration object from the plurality of IO commands before the configuration object is modified.

8. The computer program product of claim 7, wherein the operations further comprise:
   suspending one or more TO commands directed to the suspended configuration object received subsequent to suspending the configuration object.

9. The computer program product of claim 8, wherein the operations further comprise:
   processing one or more TO commands directed to the suspended configuration object received prior to suspending the configuration object based upon, at least in part, the bitmap.

10. The computer program product of claim 9, wherein the operations further comprise:
    modifying the configuration object based on the modification request in response to processing the one or more TO commands directed to the suspended configuration object received prior to suspending the configuration object and suspending the one or more TO commands directed to the suspended configuration object received subsequent to suspending the configuration object based upon, at least in part, the bitmap.

11. The computer program product of claim 10, wherein the operations further comprise:
    releasing the suspension of the configuration object; and
    processing the suspended one or more TO commands directed to the configuration object received subsequent to suspending the configuration object.

12. The computer program product of claim 7, wherein the configuration object includes a storage volume within the storage system.

13. A computing system comprising:
    a memory architecture; and
    a processor configured to receive a plurality of input/output (TO) commands for a plurality of configuration objects of a storage system, wherein the processor is further configured to receive a modification command for a configuration object of the plurality of configuration objects, wherein the processor is further configured to suspend the configuration object in response to receiving the modification command, wherein suspending the configuration object includes: generating a bitmap indicating whether each of the plurality of TO commands are directed to the suspended configuration object, processing one or more TO commands directed to the suspended configuration object received prior to suspending the configuration object based upon, at least in part, the bitmap; suspending one or more TO commands directed to the suspended configuration object received subsequent to suspending the configuration object; and modifying the configuration object based on the modification request in response to processing the one or more TO commands directed to the suspended configuration object received prior to suspending the configuration object and suspending the one or more TO commands directed to the suspended configuration object received subsequent to suspending the configuration object based upon, at least in part, the bitmap, and wherein the processor is further configured to process one or more TO commands directed to the suspended configuration object from the plurality of TO commands before the configuration object is modified.

14. The computing system of claim 13, wherein the processor is further configured to:
    release the suspension of the configuration object; and
    process the suspended one or more IO commands directed to the configuration object received subsequent to suspending the configuration object.

* * * * *